United States Patent

[11] 3,561,773

[72] Inventors Hans Baumann
Hombergsteig 15, Nussbaumen;
Heinrich Lorenzen, Auguartenstrasse 221,
Ennetturgi, Switzerland
[21] Appl. No. 791,449
[22] Filed Jan. 15, 1969
[45] Patented Feb. 9, 1971
[32] Priority Jan. 25, 1968
[33] Switzerland
[31] 1190/68

[54] FLOATING-RING SHAFT SEAL
4 Claims, 4 Drawing Figs.
[52] U.S. Cl. ................................................. 277/71,
277/83
[51] Int. Cl. .......................................... B65d 53/00
[50] Field of Search .......................................... 277/59, 70,
71, 74, 77, 78, 79, 102, 104, 83, 3

[56] References Cited
UNITED STATES PATENTS
2,509,912 5/1950 Eliasson ........................ 277/79X
3,088,744 5/1963 Ezekiel et al. ................. 277/3
3,149,846 9/1964 Verbeek ........................ 277/71X

*Primary Examiner*—Frederick L. Matteson
*Assistant Examiner*—Harry B. Ramey
*Attorney*—Pierce, Scheffler and Parker

ABSTRACT: A shaft seal for sealing off an opening where the shaft passes through a wall enclosing a pressurized space comprises a floating sealing ring located within a recess in the wall opening and surrounding the shaft. A fluid sealing medium is introduced into the recess under pressure which causes the sealing ring to be forced axially in the direction of a wall surface within the recess, and a supporting member, for example, in the form of an assembly of axially extending rods surrounds the shaft intermediate the sealing ring and the wall surface to take up the force applied against the sealing ring by the pressurized sealing medium. The axially extending rods are stiff in an axial direction but flexible in a radial direction so as to allow the ends thereof in contact with the sealing ring to shift radially and accommodate themselves to radial shifts of the sealing ring. A cylindrical liner can be installed around the rod assembly to seal it off from pressures which would otherwise be exerted directly against it by the pressurized sealing medium.

PATENTED FEB 9 1971

3,561,773

Inventors
Hans Baumann
Heinrich Lorenzen

By Pierce, Scheffler & Parker
Attorneys

FLOATING-RING SHAFT SEAL

The invention relates to a floating-ring seal for sealing off the place where a shaft passes through the wall of a pressurized space filled with gas or liquid, the foating-ring being axially pressed with great force against the wall under the action of a sealing medium, and being radially moveable for the purpose of adaption to shaft movements.

Floating-ring seals for sealing off against high pressures in the medium which is required to seal and involving correspondingly high sealing medium pressures, are attended by the problem that the ring which provides a seal with respect to atmosphere is axially pressed with very great force against its supporting surface. The resultant friction necessitates a large radial displacement force for the floating-ring when the shaft moves or vibrates, and from a definite sealing medium pressure upwards the said displacement force can no longer be transmitted by the film between the ring and the shaft. The consequence is destruction of the film, and wear occurs on the ring and the shaft. At very high pressures, the strange situation arises that the shaft is guided as in a badly designed bearing in a floating ring which is no longer "floating." If any unbalance occurs in the rotor, there is the danger of the floating ring being destroyed, which not only makes the seal ineffective, but can lead to damage to the machine.

In order to avoid these disadvantages, it has already been proposed (German Pat. application A 53 169 X11/47 f) to support the floating ring against the housing via an additional force-transmitting surface in order to relieve the load on its sealing surface. However, it has transpired that at high contact pressures either the sum of the frictional resistances is still too high to keep the displacement force which is necessary to overcome the said sum within permissible limits, or the Hertzian surface-pressure is too great. Hydraulic pressure relief for the floating-ring is of assistance, but more expense is involved and the consumption of sealing medium at high pressure increases.

The present invention is based on the problem of avoiding the disadvantages and dangers indicated even at the very high axial forces at which the floating ring is pressed against the wall, and of ensuring that the floating ring is easily displaceable in the radial direction. According to the invention, this problem is solved by a supporting member which extends axially between the wall and the floating ring, which transmits the contact force and is axially stiff, and whereof the end which comes to bear against the floating ring is radially displaceable with respect to the end pressed against the wall.

In the accompanying drawings, an overall arrangement of a floating-ring-type seal to which the present invention relates, is illustrated in section in FIG. 1;

Figure 1:
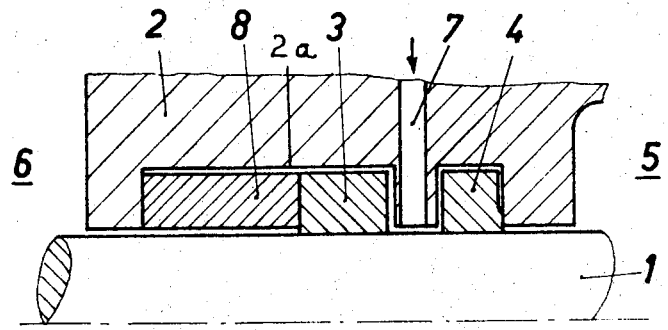

With reference now to the drawings, at the place where the shaft 1 passes through the wall 2, floating rings 3, 4 are accommodated in recesses 2a, and have the task of preventing a gas or liquid from flowing out along the shaft from the highly pressurized space 5 to the surrounding atmosphere 6. A sealing medium which may be gaseous or liquid and is at higher pressure than the medium to be sealed is fed through the pipe 7. The sealing medium forces the floating ring 3 with great force axially, in the drawing to the left, against the wall. In order to keep the floating ring radially movable in spite of the high contact pressure, a supporting member 8 within the recess 2a extends between it and the wall. This member must be capable of transmitting axial forces, but of allowing for radial movements on the part of the floating ring 3.

Possibilities for embodying the supporting member are depicted in the following FIGS. According to FIG. 2, it consists of cylindrical array rods 9 axially parallel to the shaft 1 which are axially stiff and uniformly distributed over the circumference. In order to facilitate assembly, and also if appropriate to increase resistance to bending, they may expediently be linked to one another, but this must not impair their flexibility. They are loosely inserted by way of their ends into the wall and into the floating ring, and cemented, welded, soldered or otherwise fastened to these parts.

If one end of the rods is held fast in the manner described in the wall, the other ends thereof and together with them the floating ring can carry out a radial movement without any large force being necessary for that purpose. On the other hand, the rods are capable of transmitting a large axial force from the floating ring to the wall. In order to prevent the sealing medium from flowing away freely between the rods, the wall includes a shoulder 10 in conjunction with which the floating ring forms a narrow sealing gap, whereof the width may be set by the axial size of the supporting member, the rods in the example according to FIG. 2.

Figure 3:
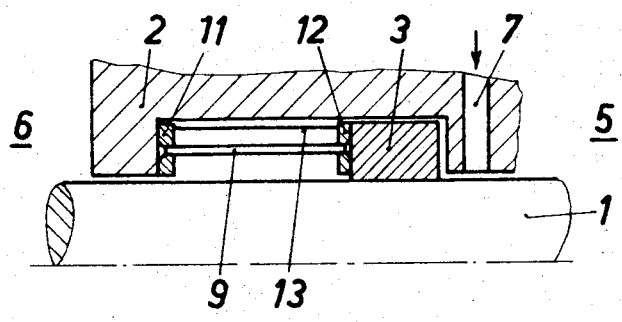
FIG. 3 is also an axial section illustrating a shaft seal in accordance with a second embodiment of the invention.

According to FIG. 3, the supporting member is provided with annular end plates 11,12, to which the force-transmitting rods 9 are fastened in one of the ways mentioned. The end plate 11 bears against the wall 2, and the end plate 12 bears against the floating ring 3, which is thus radially movable.

Figure 2:
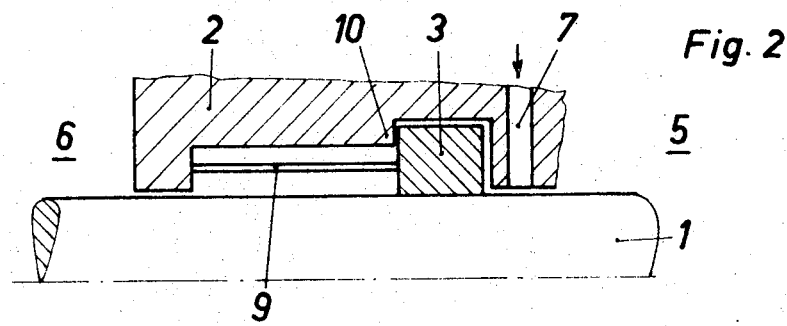
FIG. 2 is a view in axial section illustrating such a shaft seal in accordance with one embodiment of the invention.

A possible method of blocking-means sealing, namely the arrangement of an additional sealing gap between the floating ring and the wall, was shown in the case of the embodiment according to FIG. 2. Another possibility is indicated in FIG. 3. Between the end plates 11, 12 there is a liner element 13, which may be an elastic jacket of any kind, for example, a stiffened or sufficiently stiff bellows, arranged outside or inside the rods, or even an annular filler linking the rods may be used. The essential thing is that the liner 13 of the supporting member shall constitute a seal with respect to sealing medium and pressure, and shall not hinder radially movements on the part of the floating ring.

Figure 4:
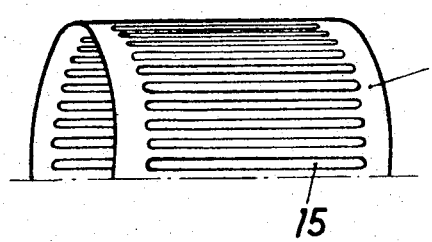
FIG. 4 is view in perspective of a supporting member for the floating-ring seal according to a third embodiment of the invention.

Tubes of correspondingly small diameter may also be used instead of the rods 9. FIG. 4 shows another design for the supporting member. It consists of a single tube 14 surrounding the shaft. The tube is provided with longitudinal slits 15 in such a manner that rodlike fillets remain, resulting in the same action as in the case of individual rods or tubes. A supporting member formed in this manner may also be provided with end plates.

The use of a supporting member between the wall and the floating ring, which member can transmit even the greatest axially acting forces encountered and which is supported by way of one end against the wall, while the other end, which can yield to bending forces, is supported against the floating ring, results in the latter being radially movable and being able to fulfil unhindered its task as a sealing element for the place where a shaft passes through a wall.

We claim:

1. In a floating-ring-type shaft seal for sealing off floating ring opening where the shaft passes through a wall enclosing a pressurized space filled with gas or liquid, the combination comprising a floating sealing ring located within a recess in the wall opening and which surrounds said shaft, means for introducing a fluid sealing medium into said recess under pressure, the pressure of said sealing medium being exerted against one end face of said sealing ring, and supporting means located within said recess and interposed between the other end face of said sealing ring and said wall for transmitting the fluid pressure exerted by said sealing medium against said floating ring to said wall, said supporting means being constituted by a cylindrical array of circumferentially spaced rodlike axially stiff but radially movable members surrounding said shaft and axially parallel therewith, said rodlike supporting member having one end thereof bearing against said wall and the other end bearing against said sealing ring.

2. A shaft seal of the floating-ring-type as defined in claim 1 and which further includes a liner surrounding said supporting means within said recess, said liner serving to seal off said supporting means from the pressure of said fluid sealing medium.

3. A shaft seal of the floating-ring-type as defined in claim 1 and which further includes annular end plates located at the opposite ends of said cylindrical array of rodlike members and secured thereto.

4. A shaft seal of the floating-ring-type as defined in claim 1 and wherein said cylindrical array of rodlike members is established by an axially stiff tubular member surrounding said shaft and axially parallel therewith, said tubular member being provided with circumferentially spaced axially extending slits which thereby develop rodlike fillets therewith.

PO-1050
(5/69)

UNITED STATES PATENT OFFICE
CERTIFICATE OF CORRECTION

Patent No. 3,561,773            Dated February 9, 1971

Inventor(s) HANS BAUMANN and HEINRICH LORENZEN

It is certified that error appears in the above-identified patent and that said Letters Patent are hereby corrected as shown below:

Claim 1, lines 1 and 2, cancel "floating ring" and substitute -- an --

Signed and sealed this 18th day of May 1971.

(SEAL)
Attest:

EDWARD M. FLETCHER, JR.
Attesting Officer

WILLIAM E. SCHUYLER,
Commissioner of Pate